United States Patent
Hu

(10) Patent No.: US 10,943,081 B2
(45) Date of Patent: Mar. 9, 2021

(54) DEVICE FOR TOUCH AND FINGERPRINT RECOGNITION

(71) Applicant: WUHAN CHINA STAR OPTOELECTRONICS TECHNOLOGY CO., LTD., Hubei (CN)

(72) Inventor: Li Hu, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 43 days.

(21) Appl. No.: 16/475,682

(22) PCT Filed: May 14, 2019

(86) PCT No.: PCT/CN2019/086850
§ 371 (c)(1),
(2) Date: Jul. 3, 2019

(87) PCT Pub. No.: WO2020/191882
PCT Pub. Date: Oct. 1, 2020

(65) Prior Publication Data
US 2020/0311367 A1    Oct. 1, 2020

(51) Int. Cl.
*G06K 9/00* (2006.01)
*G06F 3/041* (2006.01)
*G06F 3/044* (2006.01)

(52) U.S. Cl.
CPC ......... *G06K 9/0002* (2013.01); *G06F 3/0412* (2013.01); *G06F 3/044* (2013.01)

(58) Field of Classification Search
CPC ...... G06K 9/0002; G06F 3/0412; G06F 3/044
See application file for complete search history.

(56) References Cited

U.S. PATENT DOCUMENTS

| 2012/0105081 | A1* | 5/2012 | Shaikh | G06K 9/0002 324/686 |
| 2015/0110953 | A1* | 4/2015 | You | H01L 21/64 427/77 |
| 2016/0364593 | A1* | 12/2016 | Lee | G06F 3/0446 |
| 2017/0031514 | A1* | 2/2017 | Kimura | G06F 3/0412 |
| 2017/0069692 | A1* | 3/2017 | Lee | H01L 51/003 |
| 2017/0293378 | A1* | 10/2017 | Ahn | G06F 3/0445 |
| 2017/0351850 | A1* | 12/2017 | Jin | H04W 12/0608 |
| 2018/0068156 | A1* | 3/2018 | Jang | G06K 9/0002 |

(Continued)

FOREIGN PATENT DOCUMENTS

| CN | 206649489 U | 11/2017 |
| CN | 108052229 A | 5/2018 |

(Continued)

*Primary Examiner* — Premal R Patel
(74) *Attorney, Agent, or Firm* — Mark M. Friedman

(57) ABSTRACT

A device for touch and fingerprint recognition includes a touch screen and a cover plate disposed on the touch screen. The cover plate is a plastic film. The touch screen includes at least one first touch electrode disposed outside a fingerprint recognition region and at least one second touch electrode disposed in the fingerprint recognition region, and a distance between at least two adjacent second touch electrodes ranges from 5 μm to 50 μm.

17 Claims, 6 Drawing Sheets

(56) References Cited

U.S. PATENT DOCUMENTS

| | | | | |
|---|---|---|---|---|
| 2018/0321774 A1* | 11/2018 | Kuriki | ................ | H03K 17/9622 |
| 2019/0310723 A1* | 10/2019 | Kang | ...................... | H04W 4/80 |
| 2020/0019268 A1 | 1/2020 | Zhu et al. | | |

FOREIGN PATENT DOCUMENTS

| | | |
|---|---|---|
| CN | 108268160 A | 7/2018 |
| CN | 208126362 U | 11/2018 |

\* cited by examiner

DEVICE FOR TOUCH AND FINGERPRINT RECOGNITION

BACKGROUND OF INVENTION

Field of Invention

The present invention relates to a device for touch and fingerprint recognition, and more particularly, to a display device which can simultaneously implement touch and fingerprint recognition in a fingerprint recognition region.

Description of Prior Art

Conventionally, a touch module and a fingerprint recognition module of smart phones are two completely independent modules. A conventional capacitive fingerprint recognition unit is usually manufactured by disposing a fingerprint recognition chip on a substrate and then integrating a fingerprint recognition unit and combining with a touch screen and other devices. Generally, the touch screen is disposed on an upper surface of display screen the smart phones, and the fingerprint recognition module is disposed in the non-display region or below the display screen of the smart phones. In addition, touch resolution of the conventional capacitive touch screen only can detect touch position, which cannot meet capacitive fingerprint recognition requirements. Therefore, the fingerprint recognition requires an independent higher resolution capacitance detecting component. In general, when a finger touches a sensing region of the fingerprint recognition unit, the fingerprint recognition chip is insensitive due to outer surface of the chip covered with a multilayer film. Accordingly, it generally needs to make a through hole at a bottom of glass protective cover plate of the smart phones to reduce a thickness of film layer disposed above the fingerprint recognition chip, so that the fingerprint chip has good sensing ability.

SUMMARY OF INVENTION

Conventionally, a thickness of glass cover plate is about 0.4 mm to 1 mm, and a thickness of the conventional capacitive fingerprint for fingerprint recognition has a limited value less than 0.3 mm. Thus, if conventional capacitive fingerprint sensing units is disposed inside a protective cover plate, it cannot to implement the fingerprint recognition. Therefore, it is necessary to provide a display device which can simultaneously implement touch and fingerprint recognition in a fingerprint recognition region to solve problems existing in the prior art.

In one embodiment, a device for touch and fingerprint recognition includes a touch screen and cover plate disposed on the touch screen. The cover plate is a plastic film. The touch screen includes at least one first touch electrode disposed outside a fingerprint recognition region and at least one second touch electrode disposed in the fingerprint recognition region.

In one embodiment, the device further includes a display module, the touch screen is disposed on an upper surface of the display module, and an upper surface of the cover plate is coated with a hardened layer.

In one embodiment, the at least one first touch electrode includes at least one first driving electrode and at least one first sensing electrode, and the at least one second touch electrode includes at least one second driving electrode and at least one second sensing electrode.

In one embodiment, touch screen includes a conductive material, and the conductive material includes a metal mesh, indium tin oxide, and silver nanowires.

In one embodiment, the at least one first driving electrode and the at least one first sensing electrode are vertically intersected on a same layer, and the at least one first driving electrode and the at least one first sensing electrode vertically intersected on the same layer are electrically insulated from each other.

In one embodiment, the at least one first driving electrode and the at least one first sensing electrode are vertically intersected on different layers, and the at least one first driving electrode and the at least one first sensing electrode vertically intersected on the different layers are electrically insulated from each other.

In one embodiment, the cover plate has a thickness ranging from 0.01 μm to 200 μm.

In one embodiment, the at least one first touch electrode has a width ranging between 0.1 mm and 6 mm.

In one embodiment, a distance between two adjacent first touch electrodes ranges from 0.05 mm to 5 mm.

In one embodiment, a width of the at least one second touch electrode in the fingerprint recognition region ranges from 5 μm to 30 μm.

In another embodiment, a device for touch and fingerprint recognition includes a touch screen, cover plate disposed on the touch screen, and a display module. The cover plate is a plastic film. The touch screen includes at least one first touch electrode disposed outside a fingerprint recognition region and at least one second touch electrode disposed in the fingerprint recognition region. The touch screen is disposed on an upper surface of the display module, and an upper surface of the cover plate is coated with a hardened layer. The at least one first touch electrode includes at least one first driving electrode and at least one first sensing electrode, and the at least one second touch electrode includes at least one second driving electrode and at least one second sensing electrode.

In one embodiment, touch screen includes a conductive material, and the conductive material includes a metal mesh, indium tin oxide, and silver nanowires.

In one embodiment, the at least one first driving electrode and the at least one first sensing electrode are vertically intersected on a same layer, and the at least one first driving electrode and the at least one first sensing electrode vertically intersected on the same layer are electrically insulated from each other.

In one embodiment, the at least one first driving electrode and the at least one first sensing electrode are vertically intersected on different layers, and the at least one first driving electrode and the at least one first sensing electrode vertically intersected on the different layers are electrically insulated from each other.

In one embodiment, the cover plate has a thickness ranging from 0.01 μm to 200 μm.

In one embodiment, the at least one first touch electrode has a width ranging between 0.1 mm and 6 mm.

In one embodiment, a distance between two adjacent first touch electrodes ranges from 0.05 mm to 5 mm.

In one embodiment, a width of the at least one second touch electrode in the fingerprint recognition region ranges from 5 μm to 30 μm.

The display device can simultaneously implement touch and fingerprint recognition in a fingerprint recognition region, which solves the problem that the touch electrode resolution of the capacitive touch screen in the prior art cannot achieve capacitive fingerprint recognition.

DETAILED DESCRIPTION OF PREFERRED EMBODIMENTS

Figure 1:
FIG. 1 is a schematic view of a device for touch and fingerprint recognition according to one embodiment of the present invention.

In one embodiment, a device for touch and fingerprint recognition includes a display module, a touch screen, and a cover plate disposed on the touch screen. Preferably, the touch screen is a flexible touch screen, the touch screen includes a conductive material, and the conductive material includes a metal mesh, indium tin oxide (ITO), and silver nanowires, and the touch screen is disposed on an upper surface of the display module. Preferably, the cover plate is a plastic film, for example a polyimide film, and the cover plate has a thickness ranging from 0.01 µm to 200 µm, and an upper surface of the cover plate is coated with a hardened layer.

Compared with a conventional glass cover, the conventional glass cover has a thickness of about 0.4 mm to 1 mm, while a thickness of the conventional capacitive fingerprint for fingerprint recognition has a limited value of less than 0.3 mm. Thus, if conventional capacitive fingerprint sensing units is disposed inside a protective cover plate, it cannot implement the fingerprint recognition.

Furthermore, the touch screen includes at least one first touch electrode disposed outside a fingerprint recognition region and at least one second touch electrode disposed in the fingerprint recognition region. Specifically, the at least one first touch electrode includes at least one first driving electrode and at least one first sensing electrode, and the at least one second touch electrode includes at least one second driving electrode and at least one second sensing electrode.

In one embodiment, the at least one first driving electrode and the at least one first sensing electrode are vertically intersected on a same layer, and the at least one first driving electrode and the at least one first sensing electrode vertically intersected on the same layer are electrically insulated from each other. Preferably, the at least one first touch electrode has a width ranging between 0.1 mm and 6 mm, and a distance between two adjacent first touch electrodes range from 0.05 mm to 5 mm.

In another embodiment, the at least one first driving electrode and the at least one first sensing electrode are vertically intersected on different layers, and the at least one first driving electrode and the at least one first sensing electrode vertically intersected on the different layers are electrically insulated from each other. Preferably, the at least one first touch electrode has a width ranging between 0.1 mm and 6 mm, and a distance between two adjacent first touch electrodes range from 0.05 mm to 5 mm.

In one embodiment, a distance between two adjacent second touch electrodes in the fingerprint recognition region ranges from 5 µm to 50 µm. Preferably, a distance between two adjacent second touch electrodes in the fingerprint recognition region ranges from 5 µm to 40 µm. More preferably, a distance between two adjacent second touch electrodes in the fingerprint recognition region ranges from 5 µm to 30 µm. In addition, shapes of the first touch electrode and the second touch electrode include a square, a triangle, a circle, a trapezoid, or a combination thereof. Specifically, a width between two adjacent second touch electrodes in the fingerprint recognition region ranges from 5 µm to 50 µm, 5 µm to 40 µm, or 5 µm to 30 µm can accommodate more second touch electrodes in the fingerprint recognition region, thereby achieving a capacitive sensitivity required for fingerprint recognition. Therefore, the at least one second electrode of the touch screen can simultaneously implement touch and fingerprint recognition in the fingerprint recognition region. In other words, a touch module and a fingerprint recognition module are integrally formed within the touch screen. When a user touches a local position of the touch screen, the fingerprint can directly unlock the device, and the user can simultaneously do other things, such as playing music.

Referring to FIG. 1, a device for touch and fingerprint recognition according to one embodiment includes a display module 10, a touch screen 20 disposed on the display module 10, and a cover plate 30 disposed on the touch screen 20.

Referring FIG. 2 to FIG. 6, it should be noted that the fingerprint recognition region of FIG. 2 to FIG. 6 is merely an illustrative description, and the fingerprint recognition region may be any position of the touch screen.

Figure 2:
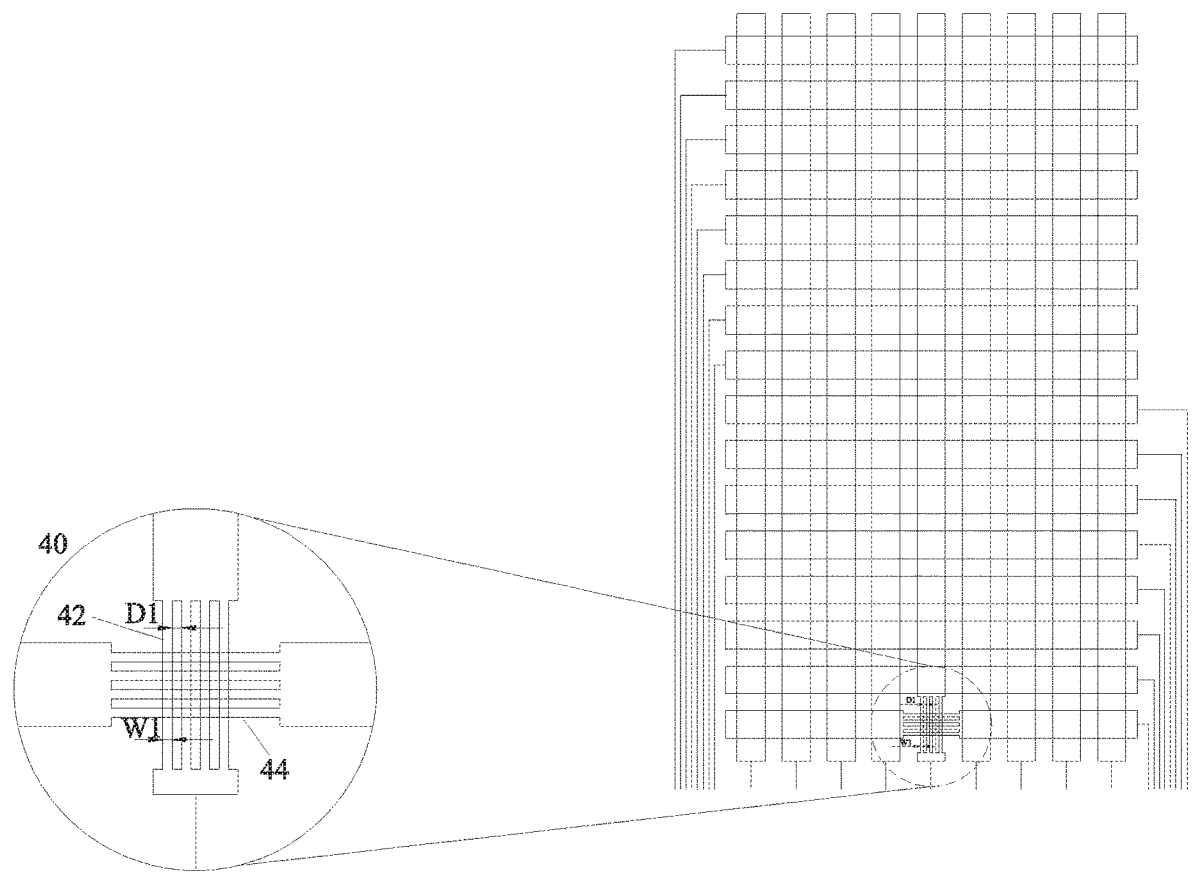
FIG. 2 is a partial enlarged schematic view of a fingerprint recognition at a lower end of a touch screen according to one embodiment of the present invention.

Referring to FIG. 2, a channel spacing D1 between individual straight second touch electrodes 42 intersecting each other in a fingerprint recognition region 40 disposed of a lower end of the touch screen is 5 µm to 50 µm. In addition, a channel spacing between two individual transverse second touch electrodes 44 is also between 5 µm to 50 µm. A width W1 of the straight second touch electrode 42 and a width of the transverse second touch electrode 44 are also between 5 µm to 50 µm.

Figure 3:
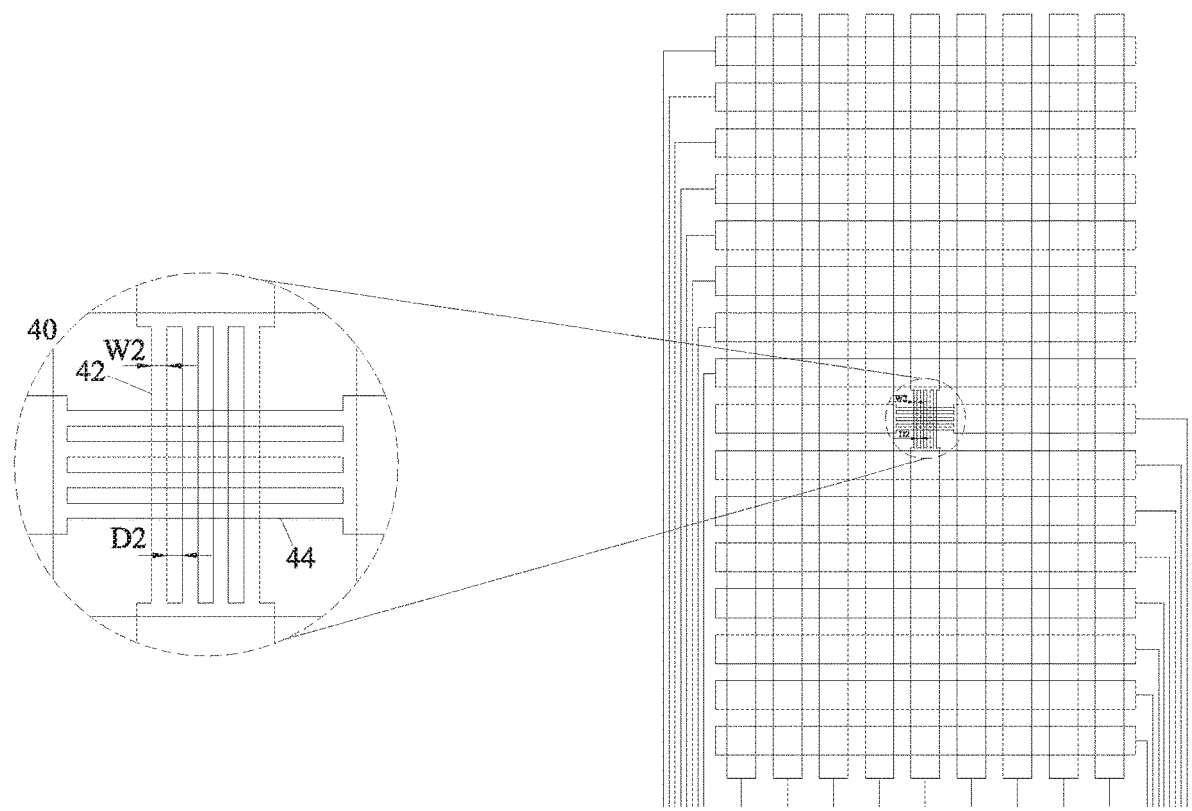
FIG. 3 is a partial enlarged schematic view of a fingerprint recognition at an intermediate region of a touch screen according to one embodiment of the present invention.

Referring to FIG. 3, a channel spacing D2 between straight second touch electrodes 42 intersecting each other in a fingerprint recognition region 40 of an intermediate region of the touch screen is 5 µm to 50 µm. In addition, a channel spacing between two individual transverse second touch electrodes 44 is also between 5 µm to 50 µm. A width W2 of the straight second touch electrode 42 and a width of the transverse second touch electrode 44 are also between 5 µm to 50 µm.

Figure 4:
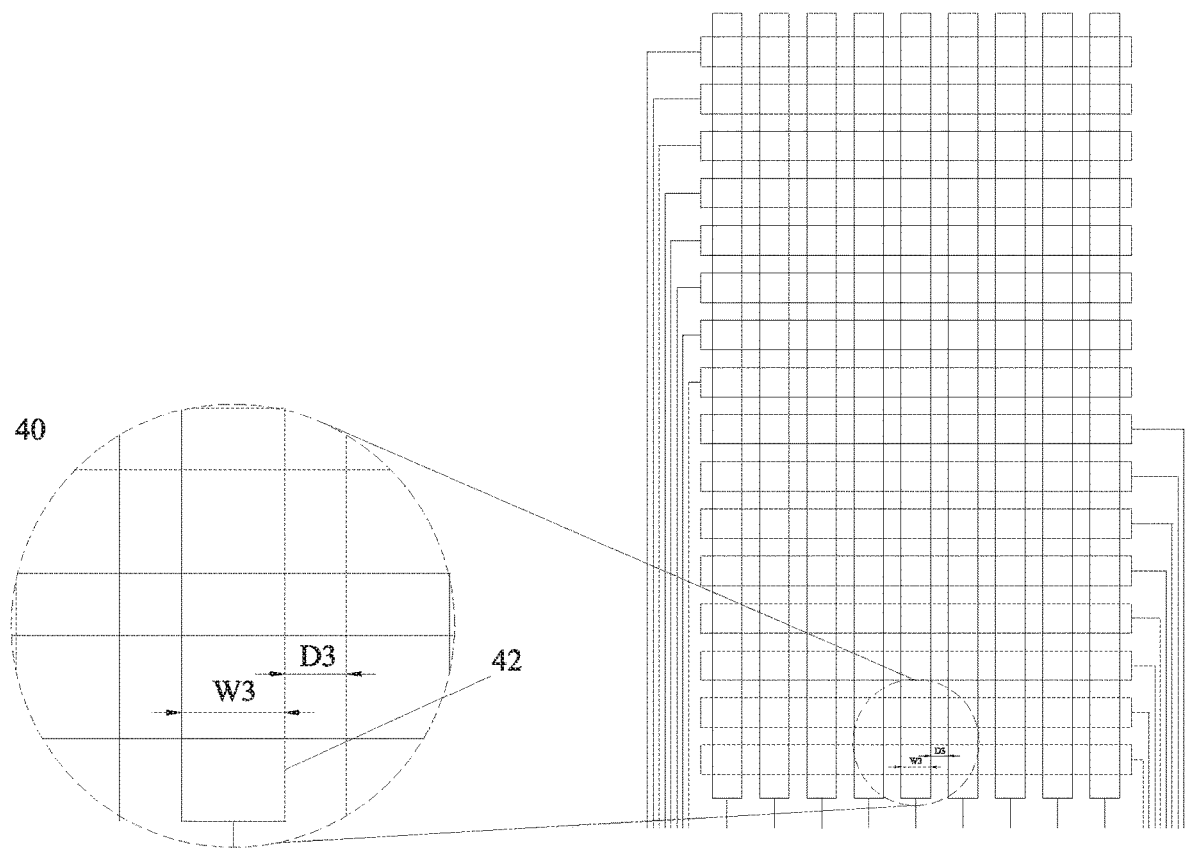
FIG. 4 is a partial enlarged schematic view of a fingerprint recognition at a lower end of a touch screen according to one embodiment of the present invention.

Referring to FIG. 4, a channel spacing D3 between a plurality of straight second touch electrodes 42 intersecting each other in a fingerprint recognition region 40 of a lower end of the touch screen is 5 µm to 50 µm. In addition, a channel spacing between a plurality of transverse second touch electrodes is also between 5 µm to 50 µm. A width W3 of the straight second touch electrode 42 and a width of the transverse second touch electrode are also between 5 µm to 50 µm.

Figure 5:
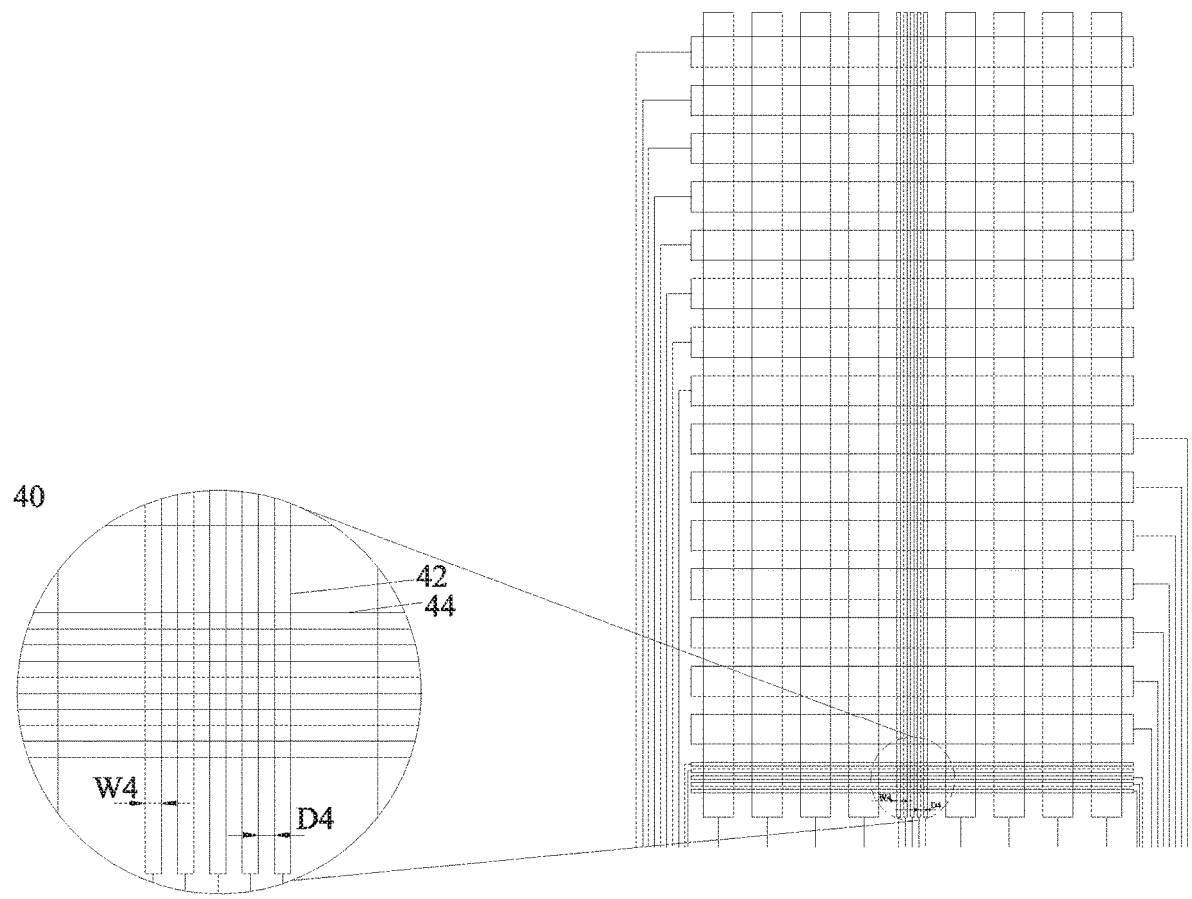
FIG. 5 is a partial enlarged schematic view of a fingerprint recognition at a lower end of a touch screen according to one embodiment of the present invention.

Referring to FIG. 5, a number of the second touch electrodes is significantly increased in a fingerprint recognition region 40 of a lower end of the touch screen. A channel width and a channel spacing of the second touch electrodes disposed in a fingerprint recognition region 40 of a lower end of the touch screen are significantly smaller than other second touch electrodes disposed remaining positions of the touch screen. A channel spacing D4 between a plurality of straight second touch electrodes 42 intersecting each other in a fingerprint recognition region is 5 µm to 50 µm. In addition, a channel spacing W4 between a plurality of transverse second touch electrodes 44 is also between 5 µm to 50 µm. A width W4 of the straight second touch electrode 42 and a width of the transverse second touch electrode are also between 5 µm to 50 µm.

Figure 6:
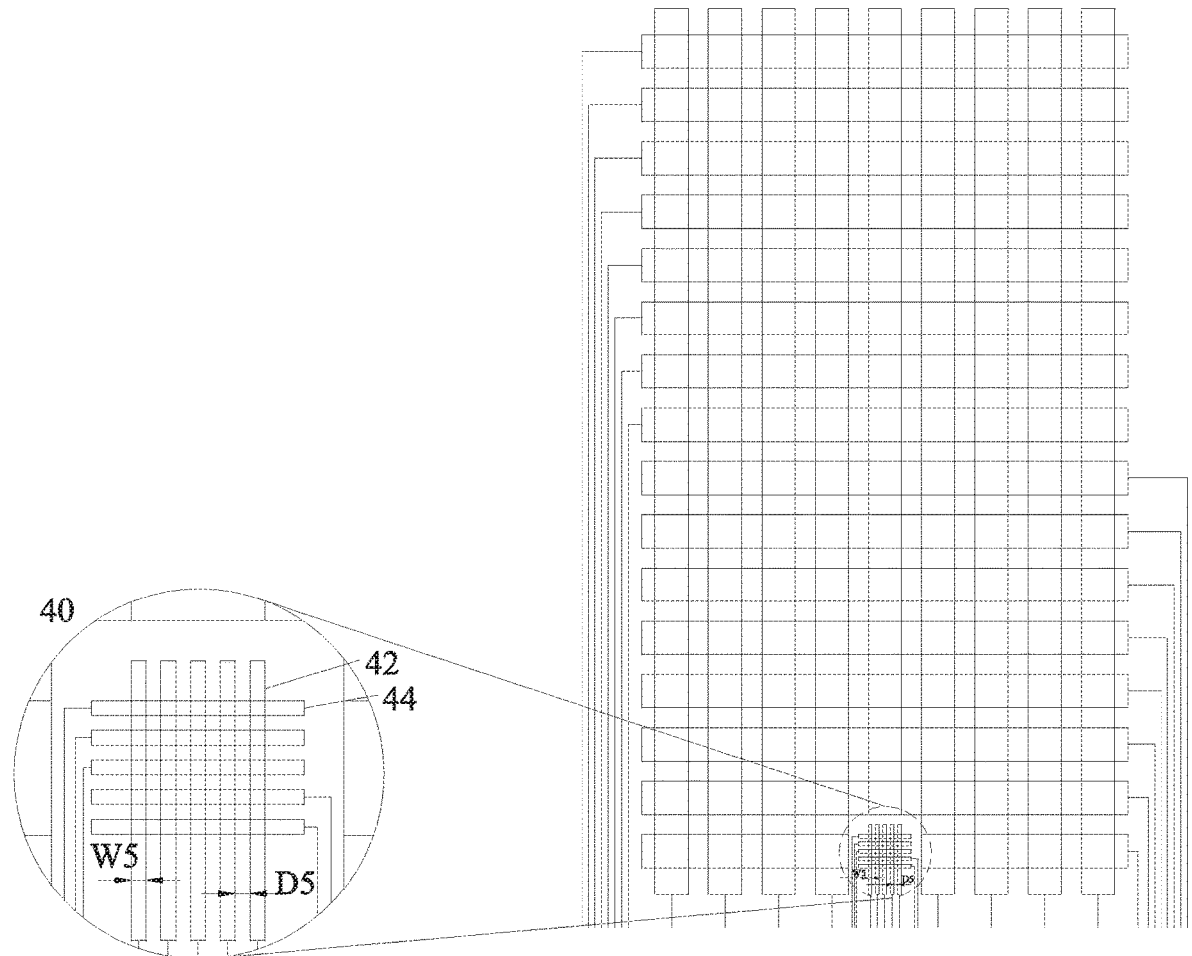
FIG. 6 is a partial enlarged schematic view of a fingerprint recognition at a lower end of a touch screen according to one embodiment of the present invention.

Referring to FIG. 6, second touch electrodes disposed in a fingerprint recognition region 40 of a lower end of the touch screen and other second touch electrodes disposed remaining positions of the touch screen are electrically insulated from each other, and a channel width and a channel spacing of the second electrodes disposed in a fingerprint recognition region 40 of a lower end of the touch screen are significantly smaller than other second touch electrodes disposed remaining positions of the touch screen. In addition, a channel spacing D5 between a plurality of straight second touch electrodes 42 intersecting each other in a fingerprint recognition region is between 5 µm to 50 µm. A channel spacing between a plurality of transverse second touch electrodes 44 is also between 5 µm to 50 µm. A width W5 of the second touch electrode is also between 5 µm to 50 µm.

Accordingly, a device for touch and fingerprint recognition is provided. A touch module and a fingerprint recognition module are integrally formed within the touch screen, and thus touch screen of the display device can simultaneously implement touch and fingerprint recognition. Therefore, it is not necessary to separately manufacture a fingerprint recognition module and then the fingerprint recognition module is integrated into the display module, and keeping the cost down.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A device for touch and fingerprint recognition, comprising:
a touch screen, wherein the touch screen comprises at least one first touch electrode disposed outside a fingerprint recognition region and at least one second touch electrode disposed in the fingerprint recognition region; and
a cover plate, wherein the cover plate is a plastic film, and the cover plate is disposed on the touch screen, wherein the at least one first touch electrode comprises at least one first driving electrode and at least one first sensing electrode, and the at least one second touch electrode comprises a plurality of second driving electrodes and a plurality of second sensing electrodes; and wherein the plurality of second driving electrodes are extended from one of the at least one first driving electrode, and the plurality of second sensing electrodes are extended from one of the at least one first sensing electrode.

2. The device for touch and fingerprint recognition according to claim 1, further comprising a display module, wherein the touch screen is disposed on an upper surface of the display module, and an upper surface of the cover plate is coated with a hardened layer.

3. The device for touch and fingerprint recognition according to claim 1, wherein touch screen comprises a conductive material, and the conductive material comprises a metal mesh, indium tin oxide, and silver nanowires.

4. The device for touch and fingerprint recognition according to claim 1, wherein the at least one first driving electrode and the at least one first sensing electrode are vertically intersected on a same layer, and the at least one first driving electrode and the at least one first sensing electrode vertically intersected on the same layer are electrically insulated from each other.

5. The device for touch and fingerprint recognition according to claim 1, wherein the at least one first driving electrode and the at least one first sensing electrode are vertically intersected on different layers, and the at least one first driving electrode and the at least one first sensing electrode vertically intersected on the different layers are electrically insulated from each other.

6. The device for touch and fingerprint recognition according to claim 1, wherein the cover plate has a thickness ranging from 0.01 µm to 200 µm.

7. The device for touch and fingerprint recognition according to claim 1, wherein the at least one first touch electrode has a width ranging between 0.1 mm and 6 mm.

8. The device for touch and fingerprint recognition according to claim 1, wherein a distance between two adjacent first touch electrodes ranges from 0.05 mm to 5 mm.

9. The device for touch and fingerprint recognition according to claim 1, wherein a width of the at least one second touch electrode in the fingerprint recognition region ranges from 5 µm to 30 µm.

10. A device for touch and fingerprint recognition, comprising:
a touch screen, wherein the touch screen comprises at least one first touch electrode disposed outside a fingerprint recognition region and at least one second touch electrode disposed in the fingerprint recognition region; and
a cover plate, wherein the cover plate is a plastic film, and the cover plate is disposed on the touch screen;
a display module, wherein the touch screen is disposed on an upper surface of the display module, and an upper surface of the cover plate is coated with a hardened layer;
wherein the at least one first touch electrode comprises at least one first driving electrode and at least one first sensing electrode, and the at least one second touch electrode comprises a plurality of second driving electrodes and at least one a plurality of second sensing electrodes; and wherein the plurality of second driving electrodes are extended from one of the at least one first driving electrode, and the plurality of second sensing electrodes are extended from one of the at least one first sensing electrode.

11. The device for touch and fingerprint recognition according to claim 10, wherein touch screen comprises a conductive material, and the conductive material comprises a metal mesh, indium tin oxide, and silver nanowires.

12. The device for touch and fingerprint recognition according to claim 10, wherein the at least one first driving electrode and the at least one first sensing electrode are vertically intersected on a same layer, and the at least one first driving electrode and the at least one first sensing electrode vertically intersected on the same layer are electrically insulated from each other.

13. The device for touch and fingerprint recognition according to claim 10, wherein the at least one first driving electrode and the at least one first sensing electrode are vertically intersected on different layers, and the at least one first driving electrode and the at least one first sensing electrode vertically intersected on the different layers are electrically insulated from each other.

14. The device for touch and fingerprint recognition according to claim 10, wherein the cover plate has a thickness ranging from 0.01 μm to 200 μm.

15. The device for touch and fingerprint recognition according to claim 10, wherein the at least one first touch electrode has a width ranging between 0.1 mm and 6 mm.

16. The device for touch and fingerprint recognition according to claim 10, wherein a distance between two adjacent first touch electrodes ranges from 0.05 mm to 5 mm.

17. The device for touch and fingerprint recognition according to claim 10, wherein a width of the at least one second touch electrode in the fingerprint recognition region ranges from 5 μm to 30 μm.

\* \* \* \* \*

UNITED STATES PATENT AND TRADEMARK OFFICE
CERTIFICATE OF CORRECTION

| | | |
|---|---|---|
| PATENT NO. | : 10,943,081 B2 | Page 1 of 1 |
| APPLICATION NO. | : 16/475682 | |
| DATED | : March 9, 2021 | |
| INVENTOR(S) | : Li Hu | |

It is certified that error appears in the above-identified patent and that said Letters Patent is hereby corrected as shown below:

On the Title Page

Item (30) should be added as follows:
Foreign Application Priority Data
March. 27, 2019 (CN)...................... 201910235417.9

Signed and Sealed this
Sixth Day of September, 2022

*Katherine Kelly Vidal*

Katherine Kelly Vidal
*Director of the United States Patent and Trademark Office*